UNITED STATES PATENT OFFICE 2,070,990

TREATMENT OF HALOGENATED POLYHYDRIC ALCOHOLS

Herbert P. A. Groll, Oakland, and George Hearne, Berkeley, Calif., assignors to Shell Development Company, San Francisco, Calif., a corporation of Delaware No Drawing. Application June 25, 1934, Serial No. 732,303

26 Claims. (Cl. 260—156.5)

This invention relates to a novel process for the treatment of halogenated polyhydric alcohols wherein the halogen atoms are not in excess of the hydroxyl groups, and comprises reacting such a halogenated polyhydric alcohol with a relatively dilute aqueous solution or suspension of a suitable basic or basic reacting compound whereby hydroxy-epoxides, polyepoxides and/or polyhydric alcohols containing fewer halogen atoms may be obtained. More particularly, the present invention is concerned with a process for the production of glycidols (hydroxy-epoxides) which comprises reacting a halogenated polyhydric alcohol of the type herein specified, with a dilute aqueous solution of a basic or basic reacting compound, under conditions at which substantial hydration of the hydroxy-epoxide may be avoided.

Another object of the present invention is to provide certain new and useful hydroxy-epoxides and their substitution products, and a practical, convenient and economical method for the preparation of the same. We are particularly concerned with a novel class of hydroxy-epoxides, the members of which are characterized by possessing a tertiary carbon which may or may not be embraced in an epoxy structure.

The present invention provides a general method for the conversion of halogenated polyhydric alcohols to epoxy compounds and/or their corresponding hydration products. It will be evident that the main reaction product may be an epoxy compound or its corresponding hydration product depending on which type of compound is desired. We may execute our invention in such a manner and under such conditions that substantially an epoxide, its hydration product or mixtures thereof may be obtained.

Our invention provides a means for preparing hydroxy-epoxides, as well as polyepoxides which do not possess an hydroxyl group. The type of epoxide obtained will be dependent on the specific halogenated polyhydric alcohol reacted. In general, those halogenated polyhydric alcohols possessing a greater number of hydroxy groups than halogen atoms will yield hydroxy-epoxides. Polyepoxides are usually obtained when the compound treated possesses an equal number of halogen atoms and hydroxyl groups. In some cases, when the compound possesses an equal number of halogen atoms and hydroxyl groups, a polyepoxide may not form due to the relative positions of the halogen atoms and hydroxyl groups. For example, when γ,γ'-dichlorisobutylene glycol

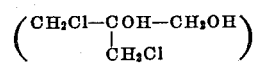

is treated in accordance with our method, the primary reaction product is the β-(chloromethyl)-glycidol

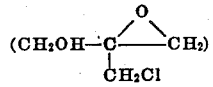

instead of the polyepoxide of the structure

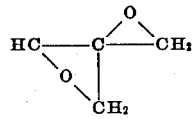

Steric hindrance probably prevents the formation of the polyepoxide.

The present invention is not concerned with the treatment of halogenated alcohols which contain more halogen atoms than hydroxyl groups to the molecule. The treatment of these compounds is embraced in a copending application.

We have found that the principles of the present invention are especially applicable to the treatment of halogenated polyhydric alcohols containing a tertiary carbon atom, and are particularly applicable to those containing a tertiary carbinol group. Halogenated polyhydric alcohols containing a tertiary carbinol group may be converted to epoxy compounds and/or hydration products thereof in excellent yields.

The halogenated polyhydric alcohols which may be treated in accordance with the present invention may be of aliphatic, aralkyl or alicyclic character. Suitable alcohols contain at least one halogen atom and a plurality of carbinol groups which may be of primary, secondary and/or tertiary character. It is to be understood that a suitable alcohol may be of mixed character, that is, it may possess primary as well as secondary and/or tertiary carbinol groups. The saturated as well as suitable unsaturated alcohols may be employed.

A preferred group of halogenated polyhydric alcohols includes, among others, compounds such as

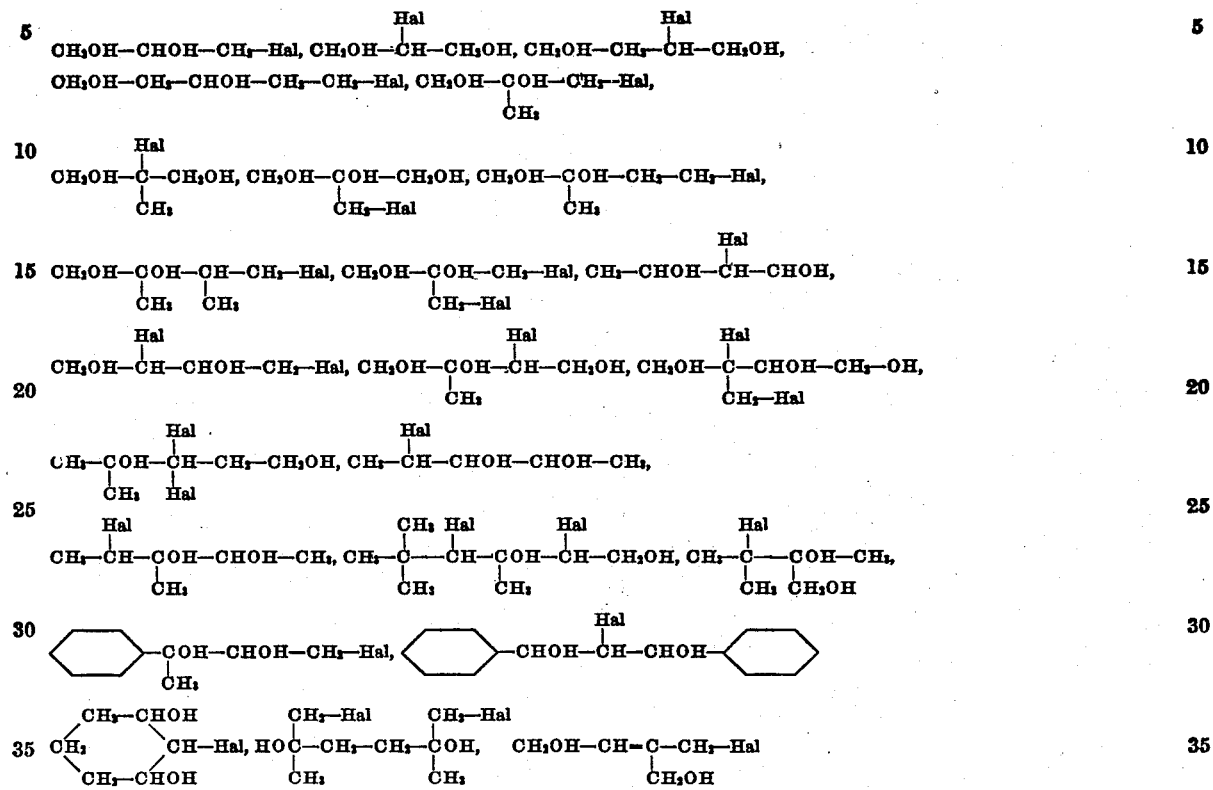

and the like, as well as their homologues, analogues and suitable substitution products.

A preferred group of suitable halogenated alcohols includes those wherein a halogen atom and hydroxy group are linked, respectively, to vicinal carbon atoms. These compounds when treated by our method will yield epoxides of the structure

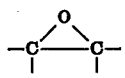

wherein the epoxy oxygen linkage is between the two vicinal carbon atoms.

By our method, we may also react halogenated polyhydric alcohols wherein a hydroxy group and halogen atom are not linked, respectively, to vicinal carbon atoms or carbon atoms separated from each other by tertiary carbon atoms and obtain epoxides wherein the epoxide oxygen linkage is established between carbon atoms not adjacent to each other. For example, we may obtain epoxides of the structures

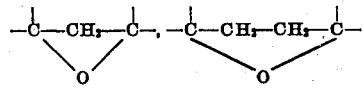

and the like.

It is to be understood that the term "hydroxy-epoxide" is used herein and in the appended claims to designate a member of that class of compounds possessing at least one epoxy group and at least one carbinol group which carbinol group or groups may or may not be linked to a carbon atom embraced in an epoxy structure. The carbinol group or groups, as well as the carbon atoms embraced in an epoxy group or groups may be of primary, secondary, tertiary or mixed character.

When a suitable halogenated polyhydric alcohol containing a tertiary carbon atom is treated in accordance with the principles of our invention, we may obtain hydroxy-epoxides characterized by possessing a tertiary carbon atom which may or may not be linked to another carbon atom by an epoxy oxygen linkage. The saturated aliphatic hydroxy-epoxides of this class which do not possess an hydroxyl group linked to an epoxy carbon atom are novel compositions of matter.

In the execution of our invention, the reactions which may be assumed to occur are represented by the specific equation of the reaction of $\beta$-methyl glycerine monochlorhydrin with an aqueous solution of sodium hydroxide. The primary reaction probably proceeds as follows:

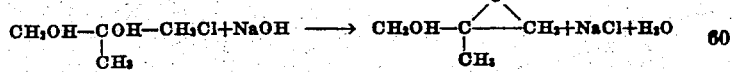

A secondary reaction which comprises hydration of the $\beta$-methyl glycidol may be substantially avoided by separating the methyl glycidol from the aqueous reaction mixture; however, if desired, the hydration reaction may be permitted to proceed, resulting in the formation of $\beta$-methyl glycerol in accordance with the reaction

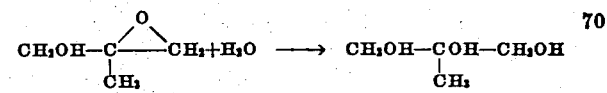

We prefer to execute our invention by reacting a halogenated polyhydric alcohol of the type herein described with a preferably dilute aqueous solution or suspension of a suitable alkaline or alkaline reacting compound. A suitable alkaline compound is one which in the presence of a relatively large amount of water is capable of effecting the removal of at least one mol. of hydrogen halide from one mol. of halogenated polyhydric alcohol reacted and thereby effecting conversion of the halogenated alcohol to an hydroxy-epoxide, polyepoxide and/or hydration products thereof. The basic compound may be any suitable basic metal compound such as the metal oxides, hydroxides, carbonates, borates, bicarbonates, etc. which are alkaline reacting and capable of effecting the desired reaction. A preferred group of basic reacting compounds includes the alkali- and alkaline earth metal hydroxides and oxides, as well as suitable basic reacting salts of strong bases and weak acids such as the carbonates, bicarbonates, borates and the like. The following is a list of suitable basic or basic reacting compounds: KOH, NaOH, $K_2O$, $Na_2O$, CaO, $Ca(OH)_2$, BaO, $Ba(OH)_2$, $Mg(OH)_2$, $Al(OH)_3$, $Al_2O_3$, $Cd(OH)_2$, $Co(OH)_3$, $Fe(OH)_3$, $Pb(OH)_2$, PbO, $Mn(OH)_2$, $Mn_2O_3$, $Ni(OH)_3$, $K_2CO_3$, $Na_2CO_3$, $KHCO_3$, $NaHCO_3$, $NaBO_4$, $Na_2B_2O_4$, $Na_2B_4O_7$, $K_2B_4O_7$, $Ca(BO_4)_2$, $Ba(BO_4)_2$, $CaB_4O_7$ and the like. We may also employ ammonium compounds such as $NH_4OH$, $(NH_4)_2CO_3$, $NH_4BO_4$, $(NH_4)_2B_4O_7$ and the like, although the employment of basic ammonium compounds may result in the formation of amino compounds such as glycamines. In cases where it may be desirable, suitable basic or basic reacting organic compounds such as amines, hydroxyl-amines, pyridine and its homologues and the like as well as the metal alcoholates may be used.

In general, the suitable basic compound selected is applied as a solution or suspension in a relatively large amount of water. We prefer to employ aqueous solutions or suspensions wherein the water is in substantial gravimetric excess of the basic reacting compound. In some cases when the halogenated polyhydric alcohols treated possess at least one tertiary carbinol group and hydroxyl groups in excess of the halogen atoms, it may be desirable, due to the readiness with which the resulting hydroxy-epoxide may be hydrated, to preclude the presence of water. In such cases, if substantially only an hydroxy-epoxide is desired as the main reaction product, we may effect the primary reaction in the initial absence of water or relatively large amounts thereof. We may treat the selected halogenated polyhydric alcohol containing a tertiary carbon atom with an alkali- or alkaline earth metal or we may employ any suitable basic or basic reacting compound. In addition to the alkali- and alkaline earth metals, we may use those metals of subgroup II of the periodic table which possess an atomic number less than 57. This group of metals includes beryllium, magnesium, zinc and cadmium. In general, the use of metals of this latter group requires the employment of relatively high reaction temperatures whereby losses due to polymerization, rearrangement and other undesirable side reactions may occur. When a metal is employed, it may be added directly to the halogenated alcohol or to the alcohol dissolved or suspended in a suitable inert organic compound. If a basic or basic reacting compound is employed, such a compound or mixture of compounds may be added directly to the halogenated polyhydric alcohol or to the latter dissolved or suspended in a suitable solvent which may or may not be inert to the basic compound. Suitable solvents include alcohols, ethers, esters, hydrocarbons, halogenated hydrocarbons and the like. The basic compound, as well, may be dissolved or suspended in a suitable solvent which may or may not be inert to it. It is essential that the resulting solution or suspension be basic reacting, and preferably substantially anhydrous. For example, a metal hydroxide may be added to an alcohol; the solution or suspension due to the reaction of the alcohol and hydroxide may contain the corresponding alcoholate and water as well as the hydroxide and alcohol. If the amount of water thus introduced is deleterious, it may be removed therefrom by any suitable means such as distillation. If desired, anhydrous metal alcoholates may be prepared and employed per se or in solution or suspension in an alcohol or other suitable solvent.

We may execute the present invention in a wide variety of manners depending on the specific reactants employed and on whether substantially only an epoxy compound or its hydration product is desired. In general, when substantial yields of an epoxide are desired, an amount of the basic compound equivalent to the reactive hydrogen halide content of the halogenated polyhydric alcohol is contacted with the latter in a suitable reaction vessel equipped with means for cooling and/or heating and effecting agitation of its contents. In the majority of cases, we prefer to use aqueous solutions of NaOH due principally to the low relative cost and availability of this reagent. The preferred normality of the aqueous solution applied may be in the range of from 0.1 normal to 8 normal. Two normal aqueous hydroxide solutions may be generally employed with excellent results.

When the object of our invention is to produce substantially polyepoxides, we have found $Ca(OH)_2$ and $Mg(OH)_2$ to be particularly suitable basic substances. These metal hydroxides are applied, in the majority of cases, as slurries with water. However, when hydroxy-epoxides or polyhydric alcohols are prepared by our method, we have found that the use of basic calcium compounds is undesirable. The calcium halide formed in the course of the reaction may react with available hydroxyl groups to form undesirable addition products; and thus complicate the recovery of the reaction product and decrease the yields obtainable.

In the majority of cases the reaction is initiated on contact of the reactants at room temperature. The reaction is exothermic and sufficient heat is usually liberated to permit one to conduct the reaction at the desired temperature, in many cases, without resorting to external heating means, which heating means may, however, be utilized when necessary or desirable. In some cases, particularly when substantially only an epoxide is desired as the reaction product, it may be desirable to cool the reaction mixture during the contacting of the reactants. Any suitable cooling means may be resorted to when necessary or desirable. In some cases, the heat liberated during the course of the reaction may be employed to aid or effect distillation of the product from the reaction mixture. To prevent the substantial hydrolysis of the epoxide formed, and particularly when the epoxide possesses an epoxy oxygen atom linked to two vicinal carbon atoms, we prefer to keep the temperature of the reaction mixture below about 50° C. For the more stable epoxides, for example, those wherein an epoxy linkage is between non-vicinal carbon atoms, higher temperatures may be employed. This object may be accomplished by resorting to external cooling means or by regulation of the rate of admittance of one of the reactants. Preferably, the basic solution or suspension is slowly added to the stirred halogenated polyhydric alcohol contained in the reaction vessel. It will be evident that it is not our intent to limit the successful execution of our invention to any specific temperature range or mode of introduction of the reactants, diluents, solvents and the like. The optimum temperature and other conditions will be dependent on the particular reactants.

On the substantial completion of the primary reaction resulting in the formation of an epoxide, the hydration of the epoxide may be obviated by separating it from the water by some suitable means such as extraction or by distillation of water and/or epoxide therefrom under a subatmospheric pressure and conditions unfavorable to hydration of the latter. Separation may be conveniently effected by treating the aqueous reactant mixture in a continuous extraction apparatus wherein any suitable extractant such as an ester, alcohol, ether, hydrocarbon, etc. may be utilized. The extracted epoxide may be separated from its solution with the extractant by subjecting the preferably anhydrous solution to a distilling or fractionating operation. Another suitable expedient comprises distillation of water or epoxide from the neutral reaction mixture. The distillation or evaporation of the water may be effected with the kettle temperature sufficiently low to obviate the substantial occurrence of the hydration reaction by resorting to the use of subatmospheric pressures. When a basic metal compound is employed, the reaction mixture contains a metal halide which may or may not be soluble in the reaction mixture. If the solid salt is present it may be separated from the reaction mixture prior to or after removal of the water from the mixture. Its separation may be accomplished by any suitable means such as filtration, decantation, centrifugation, extraction and the like.

In the cases where halogenated polyhydric alcohols containing a tertiary carbon atom are treated in the absence of water and in the presence of a suitable solvent, the hydroxy-epoxide and solvent may be separated by distillation. If no solvent, diluent or the like is employed, the hydroxy-epoxide obtained may be purified by fractionation under subatmospheric pressures. Any solid matter present therein may be separated at any stage or stages of the recovery operation by any suitable means as above described.

If it is our object to obtain substantially only the hydration product of the intermediately formed hydroxy-epoxide or polyepoxide, we may vary our procedure accordingly by employing conditions favoring the hydration reaction.

Some of the principal conditions which favor the hydration are: The presence of water in an amount in stoichiometrical excess of the amount needed for complete hydration, prolonged contact of the epoxide and water, the presence of an acid or acid acting or basic or basic acting substance which may act as a hydration catalyst, the employment of temperatures higher than the optimum temperatures necessary for the primary reaction to form a hydroxy-epoxide. Those epoxides possessing an epoxy oxygen atom linked to two vicinal carbon atoms are readily hydrated in the presence of water and a basic acting compound at relatively low temperatures. The more stable epoxide may require more vigorous treatment. It will be evident that with regard to these conditions, the invention may be executed so that the epoxy compound may be hydrated substantially as soon as it is formed and good yields of the hydration product obtained.

The following examples are introduced for the purpose of illustrating the mode of execution of our invention where specific reactants are employed.

*Example I*

110.5 gm. (1.0 mol.) of glycerine monochlorhydrin ($CH_2Cl$—$CHOH$—$CH_2OH$) were added to 500 c. c. of a 2N sodium hydroxide solution (1 mol. NaOH) and the mixture agitated at room temperature for about 10 minutes. At the end of this time the reaction mixture was treated in a continuous ether extracting apparatus for about 12 hours.

The ether extract liquid was dried and fractionated. The reaction product was identified as glycidol

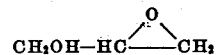

having an atmospheric boiling temperature of from 160° C. to 162° C. 37 gm. (0.5 mols) of glycidol were obtained. This represents a yield of 50%.

*Example II*

110.5 gm. (1.0 mol.) of glycerine monochlorhydrin were added to 500 c. c. of a 2N sodium hydroxide solution (1 mol. NaOH) and the mixture agitated at room temperature for about 10 minutes. The water was then distilled from the reaction mixture by reducing the pressure on the system and maintaining the temperature of the reaction mixture at or below about 50° C. When all of the water had been removed, the residue which contained solid sodium chloride was washed with anhydrous ethyl alcohol. The alcohol solution was separated from the salt and fractionated.

Glycidol

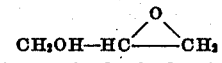

was obtained in a yield of about 45%.

*Example III*

1635 gm. (13.14 mols) of β-methyl glycerine monochlorhydrin were mixed with 500 c. c. of water. This mixture was cooled and stirred while 2625 gm. of a 20% aqueous solution of sodium hydroxide (13.14 mols NaOH) were slowly added to it. When all of the sodium hydroxide solution had been added, the mixture was treated in a continuous ether extractor for about eight hours.

At the end of this time the ether solution was removed from the extractor, dried and fractionated.

The main reaction product was β-methyl glycidol

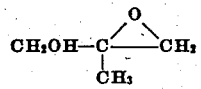

which boiled at 74° C. to 76° C. at a pressure of 26 mm. of mercury. 810 gm. (11.5 mols) of the product were obtained. This represents a yield of 70%.

Example IV 124.5 gm. (1.0 mol.) of β-methyl glycerine monochlorhydrin were mixed with 50 c. c. of water. This mixture was placed in a reaction vessel and stirred and cooled with ice while 200 gm. of an aqueous 20% solution of sodium hydroxide (1.0 mol. NaOH) was added to it. When all of the sodium hydroxide solution had been added, the pressure on the system was reduced until the water could be distilled therefrom at a kettle temperature not exceeding about 50° C.

When all the water had been removed, the residue was removed and the solid NaCl separated therefrom by extraction with ethyl alcohol. The alcoholic solution was fractionated and 53 gm. (0.6 mol.) of β-methyl glycidol were obtained. This represents a yield of 60% of the theoretical.

Example V 124.5 gm. (1.0 mol.) of β-methyl glycerine monochlorhydrin were mixed with a slurry of 64 gm. (1.0 mol.) of Mg(OH)$_2$ in 400 c. c. of water. This mixture was immediately placed in a continuous ether extraction apparatus and treated therein for about eight hours.

At the end of this time the non-aqueous liquid layer was withdrawn from the extractor, dried and fractionated. After the ether had been distilled off at atmospheric pressure, the pressure on the system was reduced and the product was distilled at a subatmospheric pressure.

53 gm. (0.6 mol.) of β-methyl glycidol were obtained. This product which was obtained in a yield of 60% was distilled in a temperature range of from 74° C. to 76° C. under a pressure of 26 mm. of mercury.

Example VI 101 gm. (0.635) of γ,γ'-dichlor isobutylene

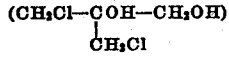

glycol were mixed with 283 c. c. of a 2.24 normal solution of sodium hydroxide (0.635 mol. of NaOH) and the mixture was agitated at a temperature of about 22° C. for ten minutes. The mixture was then placed in a continuous ether extractor and treated for about eight hours.

At the end of this time the ether extract solution was withdrawn and fractionated under a subatmospheric pressure.

The main reaction product was β-(chloro methyl) glycidol

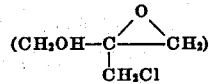

which boiled at a temperature of 85° C. under a pressure of about 1.0 mm. of mercury. The product was obtained in a yield of 65%.

It is of interest to note that, even though the halogenated polyhydric alcohol treated possessed an equal number of halogen atoms and hydroxyl groups, the primary reaction product was not a polyepoxide. The polyepoxide was not formed in substantial amounts, due probably to steric hindrance, since the resulting polyepoxide would possess a tertiary carbon atom common to two epoxy groups.

Example VII 140.5 gm. (1.0 mol.) of β-(chloro methyl) glycerine

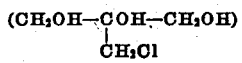

were placed in a reaction vessel and cooled and stirred while 500 c. c. of a 2N solution of sodium hydroxide (1.0 mol. of NaOH) were added to it. When all of the sodium hydroxide had been added the stirring was continued, at room temperature for about ten minutes. The reaction mixture was then put in a vacuum fractionating apparatus and the pressure on the system reduced until water could be distilled from the mixture at a kettle temperature not exceeding about 40° C.

When all of the water had been removed, the residue which contained a considerable quantity of solid NaCl was digested with alcohol, filtered and the alcoholic solution fractionated.

When the alcohol had been removed, the main reaction product, β-(hydroxy methyl) glycidol

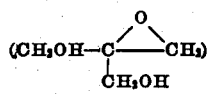

distilled at 120° C. at a pressure of about 0.6 mm. of mercury. The β-(hydroxy methyl) glycidol was obtained in a yield of 50%.

Example VIII 120 gm. (5.22 mols) of sodium wire were pressed into 1500 c. c. of anhydrous ethyl ether contained in a reaction vessel equipped with a stirrer and reflux condenser. While this mixture was stirred and cooled, 867.5 gm. (6.95 mols.) of β-methyl glycerine monochlorhydrin were slowly added. The temperature of the reaction mixture was kept at about 10° C. to 12° C. during the addition and until the evolution of hydrogen had abated. The mixture was then refluxed at its boiling temperature for about 30 minutes. At the end of this time, the reaction mixture was cooled and the solid NaCl separated by filtration.

The filtrate was fractionated. The ether was removed at its boiling point under atmospheric pressure. The residue was distilled at a subatmospheric pressure.

The main reaction products obtained were: 271 gm. (3.1 mols) of β-methyl glycidol, 30 gm. isobutenol and 85 gm. of another product which boiled at a temperature of 84.5° C. at a pressure of 13 mm. of mercury. After removal of these products, the residue consisted, mainly, of unreacted β-methyl glycerine monochlorhydrin.

The β-methyl glycidol was obtained in a yield of 59.5% calculated on the sodium applied.

Example IX 124.5 gm. (1.0 mol.) of β-methyl glycerine monochlorhydrin were mixed with an equivalent amount of a 10% NaOH solution. This mixture was stirred and heated at a temperature of about 50° C. for about 30 minutes. At the end of this time the reaction mixture was cooled and neutralized by the addition thereto of HCl. The neutral reaction mixture was heated and water was slowly distilled therefrom under atmospheric pressure. When all of the water had been removed, the residue, which contained solid NaCl was extracted with ether. The ether extract solution was dried and fractionated. When all of the ether had been removed, the residue was distilled at a subatmospheric pressure.

β-methyl glycerine

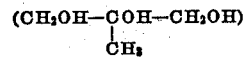

boiling in a temperature range of from 115° C. to 120° C. at a pressure of 1.6 mm. of mercury, was obtained in a yield of 80%.

Example X 138.5 gm. (1.0 mol.) of β-ethyl glycerine monochlorhydrin

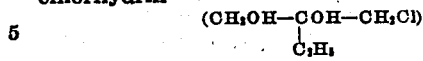

were slowly added to a cooled and stirred solution of 56 gm. (1.0 mol.) of potassium hydroxide dissolved in 200 gm. of ethyl alcohol. The reaction vessel was equipped with a suitable reflux condenser and cooling means. When the reaction had subsided, the contents of the reaction vessel were distilled under a subatmospheric pressure.

The main reaction product was β-ethyl glycidol

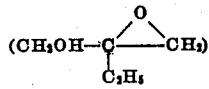

which compound was obtained in a yield of 60%. The distillation residue contained about 30 gm. of ethyl glycerine and some ethyl glycerine mono ethyl ether.

Example XI 138.5 gm. (1.0 mol.) of γ, γ-dimethyl glycerine monochlorhydrin

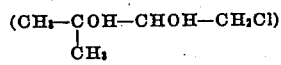

were heated in an autoclave with 84.01 gm. (1.0 mol.) of sodium bicarbonate in 216 gm. $H_2O$ at a temperature of about 120° C. for about 30 minutes.

At the end of this time the mixture was cooled, discharged from the autoclave and fractionated.

γ, γ-dimethyl glycerine was obtained in a yield of 81.6%.

Example XII 215 gm. (1.0 mol.) of diisobutenyl dichlorhydrin.

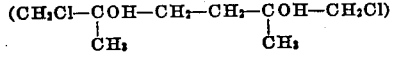

were mixed with a slurry containing 1000 c. c. of water and 1.1 mols of $Ca(OH)_2$ and the mixture was agitated at room temperature for fifteen minutes. At the end of this time the reaction mixture was charged to a continuous ether extractor wherein it was treated for about three hours. The ether extract solution was withdrawn and the ether distilled therefrom at amospheric pressure. The residue was fractionated under a subatmospheric pressure.

The main reaction product, which was obtained in a yield of 70%, was diisobutenyl dioxide

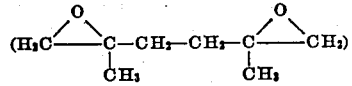

The diisobutenyl dioxide boiled in a temperature range of 170° C. to 180° C. under a pressure of 125 mm. of mercury.

It will be evident to those skilled in the art to which our invention pertains that the same may be executed in a batch, intermittent or continuous manner. In a continuous mode of operation, the reactants may be converted in a suitable reaction stage provided with heating and cooling means and means for agitating its contents as by mechanical stirring. The reaction stage may be in communication with a recovery stage or stages wherein removal of water or the epoxy compound is continuously effected by distilling or extracting means.

The products which may be obtained by our method are in general excellent selective solvents which may be used for a wide variety of solvent and extraction purposes. For example, they may be employed as extractants in numerous mineral and vegetable oil refining processes. They may also be used as intermediates in the preparation of many useful organic compounds. For example, the hydroxy-epoxides may be reacted with alcohols, acids, ammonia, amines, and the like and the corresponding useful products obtained.

By the expression "fewer halogen atoms" as used in the appended claims, we mean that the reaction product or products obtained in the execution of our invention may or may not be devoid of halogen atoms, but, in any case, the number of halogen atoms contained therein will be less than the number of halogen atoms possessed by the initially treated halogenated polyhydric alcohol. In the majority of cases, the reaction products will be devoid of halogen.

While we have in the foregoing described in some detail the preferred embodiments of our invention and some variants thereof, it will be understood that this is only for the purpose of making the invention more clear and that the invention is not to be regarded as limited to the details of operation herein described, nor is it dependent on the soundness or accuracy of the theories which we have advanced as to the advantageous results attained. On the other hand, the invention is to be regarded as limited only by the terms of the accompanying claims, in which it is our intention to claim all novelty inherent therein as broadly as possible in view of the prior art.

We claim as our invention:

1. A process for the conversion of a halogenated polyhydric alcohol to an oxy compound containing fewer halogen atoms which comprises reacting a halogenated polyhydric alcohol containing at least one tertiary carbinol group and wherein the halogen atoms are not in excess of the hydroxyl groups with a substantially non-oxidizing substance capable of liberating hydrogen halide therefrom and reacting with the liberated hydrogen halide to form a metal halide at a temperature at which the resulting less halogenated oxy compound is substantially stable.

2. A process for the conversion of a halogenated polyhydric alcohol to an epoxy compound containing fewer halogen atoms which comprises reacting a halogenated polyhydric alcohol containing at least one tertiary carbinol group and wherein the halogen atoms are not in excess of the hydroxyl groups with a metal selected from the group consisting of the alkali metals, the alkaline earth metals and beryllium, magnesium, zinc and cadmium, said reaction being effected at a temperature sufficiently low to avoid substantial decomposition of the resulting less halogenated epoxy compound.

3. A process for the conversion of a halogenated polyhydric alcohol to an oxy compound containing fewer halogen atoms which comprises reacting a halogenated polyhydric alcohol containing at least one tertiary carbinol group and wherein the halogen atoms are not in excess of the hydroxyl groups with a substantially non-oxidizing basic reacting compound at a temperature below about 150° C.

4. A process for the conversion of a halogenated polyhydric alcohol to an oxy compound containing fewer halogen atoms which comprises reacting a halogenated polyhydric alcohol containing at least one tertiary carbinol group and wherein the halogen atoms are not in excess of the hydroxyl groups with a substantially non-oxidizing basic metal compound in the presence of a substantial amount of water at a temperature at which the desired less halogenated oxy compound is substantially stable.

5. A process for the conversion of a halogenated polyhydric alcohol to an epoxy compound which comprises reacting a halogenated polyhydric alcohol containing at least one tertiary carbinol group and wherein the halogen atoms are not in excess of the hydroxyl groups with a substantially non-oxidizing basic reacting metal compound in the presence of a substantial amount of water at a temperature not greater than about 50° C.

6. A process for the conversion of a halogenated polyhydric alcohol to an oxy compound which comprises reacting a halogenated polyhydric alcohol containing at least one tertiary carbinol group and wherein the halogen atoms are not in excess of the hydroxyl groups with a substantially non-oxidizing basic acting compound in the presence of a substantial amount of water at a temperture not greater than about 50° C., and separating the epoxy compound from the reaction mixture substantially as soon as it is formed therein.

7. A process for the conversion of a halogenated polyhydric alcohol to a polyhydric alcohol containing fewer halogen atoms which comprises reacting a halogenated polyhydric alcohol containing at least one tertiary carbinol group and wherein the halogen atoms are not in excess of the hydroxyl groups with water and a substantially non-oxidizing basic-acting compound for a time and at a temperature at which the intermediately formed epoxy compound is hydrated to a polyhydric alcohol.

8. In a process for the conversion of a halogenated polyhydric alcohol to a polyhydric alcohol containing fewer halogen atoms, the step which comprises hydrating an hydroxy-epoxide by treatment with water in the presence of a basic-acting agent.

9. The step of hydrating an hydroxy-epoxide possessing a tertiary carbon atom embraced in an epoxy group to a polyhydric alcohol containing a tertiary carbinol group which comprises treating such an hydroxy-epoxide with a basic-acting agent in the presence of a substantial amount of water.

10. A process for the conversion of a halogenated polyhydric alcohol to an oxy compound containing fewer halogen atoms which comprises reacting a monohalogenated dihydric alcohol containing at least one tertiary carbinol group with a basic-acting compound in the presence of a substantial amount of water at a temperature below about 150° C.

11. A process for the conversion of a halogenated polyhydric alcohol to an epoxy compound containing fewer halogen atoms which comprises reacting a monohalogenated dihydric alcohol containing at least one tertiary carbinol group with a basic metal compound in the presence of a substantial amount of water at a temperature not greater than about 50° C., and recovering the hydroxy-epoxide.

12. A process for the conversion of a halogenated polyhydric alcohol to a polyhydric alcohol containing fewer halogen atoms which comprises reacting a monohalogenated dihydric alcohol containing at least one tertiary carbinol group with a basic metal compound in the presence of a substantial amount of water for a time and at a temperature at which the intermediately formed hydroxy-epoxide is hydrated to a trihydric alcohol.

13. A process for the conversion of β-methyl glycerine monochlorhydrin to β-methyl glycerine which comprises reacting β-methyl glycerine monochlorhydrin with an aqueous solution of a metal hydroxide at a temperature not greater than about 50° C.

14. A process for the conversion of β-methyl glycerine monochlorhydrin to β-methyl glycidol which comprises treating β-methyl glycerine monochlorhydrin with an aqueous solution of sodium hydroxide.

15. The step of hydrating an hydroxy-epoxide containing a tertiary carbon atom embraced in an epoxy group.

16. The step of hydrating an iso alkyl hydroxy-epoxide containing a tertiary carbon atom embraced in an epoxy group.

17. The step of hydrating an iso alkyl glycidol containing a tertiary carbon atom embraced in an epoxy group.

18. A saturated aliphatic hydroxy-epoxide possessing a tertiary epoxy carbon atom and a hydroxyl group linked to a carbon atom in the compound but outside of the epoxy structure.

19. A saturated aliphatic monohydroxy-epoxide possessing a tertiary carbon atom and a hydroxyl group linked to a carbon atom in the compound but outside of the epoxy structure.

20. A saturated aliphatic hydroxy-epoxide possessing a tertiary carbinol group.

21. A saturated polyhydroxy-epoxide possessing at least one carbinol group linked to three carbon atoms of an open chain aliphatic radical.

22. A saturated iso aliphatic monohydroxy-epoxide wherein the hydroxyl group is linked to a carbon atom associated with but not forming part of the epoxy group proper.

23. An aliphatic polyhydroxy-epoxide containing at least one carbinol group possessing not more than one hydrogen atom.

24. As a novel compound: β-methyl glycidol of the formula

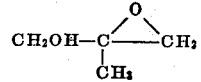

25. As a novel compound: β-methyl glycerol of the formula

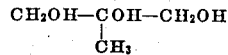

26. The polyhydric alcohol of the general formula

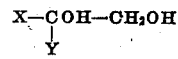

wherein X represents a carbinol group and Y represents a hydrocarbon radical, X representing a primary carbinol group, a secondary carbinol group containing at least four carbon atoms, or a tertiary carbinol group when Y contains only one carbon atom, and a secondary or tertiary carbinol group when Y contains more than one carbon atom.

HERBERT P. A. GROLL.
GEORGE HEARNE.